(12) United States Patent
Trempert

(10) Patent No.: US 10,570,940 B2
(45) Date of Patent: Feb. 25, 2020

(54) CONNECTING DEVICE AND METHOD FOR UNLOCKING THE CONNECTING DEVICE

(71) Applicant: TRUMPF MEDIZIN SYSTEME GMBH + CO. KG, Saalfeld (DE)

(72) Inventor: Alexander Trempert, Saalfeld (DE)

(73) Assignee: TRUMPF MEDIZIN SYSTEME GMBH + CO. KG, Saalfeld (DE)

(*) Notice: Subject to any disclaimer, the term of this patent is extended or adjusted under 35 U.S.C. 154(b) by 141 days.

(21) Appl. No.: 15/695,150

(22) Filed: Sep. 5, 2017

(65) Prior Publication Data

US 2018/0066689 A1    Mar. 8, 2018

(30) Foreign Application Priority Data

Sep. 7, 2016 (DE) .......................... 10 2016 216 996

(51) Int. Cl.
*F16B 7/04*     (2006.01)
*A61G 13/10*    (2006.01)
(Continued)

(52) U.S. Cl.
CPC ............ *F16B 7/0473* (2013.01); *A61G 7/05* (2013.01); *A61G 13/10* (2013.01); *A61G 13/08* (2013.01)

(58) Field of Classification Search
CPC .... A61G 7/015; A61G 7/1019; A61G 7/1046; A61G 7/1057; A61G 13/08;
(Continued)

(56) References Cited

U.S. PATENT DOCUMENTS 4,018,412 A * 4/1977 Kees, Jr. .............. A61G 13/101
                                                    24/486
4,212,454 A * 7/1980 Lee ........................ A61G 5/006
                                                    5/613
(Continued)

FOREIGN PATENT DOCUMENTS

DE   1999153858      11/1999
DE   102005054174 A1  5/2007
DE   102005054221 A1  5/2007

OTHER PUBLICATIONS

Extended European Search Report for EP17189410.8, dated Feb. 12, 2018.

*Primary Examiner* — Daniel J Wiley
(74) *Attorney, Agent, or Firm* — Barnes & Thornburg LLP

(57) ABSTRACT

A connecting device (1) for two components (4, 5) of a patient support surface is provided, said connecting device having a locking assembly (2) that is to be provided on a first component (4), and a coupling point (3) that is to be provided on a second component (5). The first and the second components (4, 5) can be connected to one another and locked in a locking position, the coupling point (3) having a locking receptacle (6) in the form of a recess. The locking assembly (2) has a support (7) that is mounted on the first component (4) and a locking element (8) that is pivotably mounted on the support (7) via a pivot bearing point (9). The locking element (8 portion (12) that is received in the locking receptacle (6) in the locking position, a bearing portion (10) on which the pivot bearing point (9) is provided, and a disengagement portion (13) that is on a different side from the locking portion (12) in relation to the bearing portion (10). The locking assembly (2) is configured such that the locking portion (12) situated in the locking receptacle (6) can be brought out of engagement with the locking (Continued)

receptacle (6) in an unlocking process and the disengagement portion (13) presses against an end face (14) of the coupling point (3) in the process.

19 Claims, 3 Drawing Sheets

(51) Int. Cl.
 *A61G 7/05* (2006.01)
 *A61G 13/08* (2006.01)
(58) Field of Classification Search
 CPC .............. A61G 13/101; A61G 13/1285; A61G 13/1245; A61G 13/1205; A61G 13/129
 See application file for complete search history.

(56) References Cited

U.S. PATENT DOCUMENTS

| | | | |
|---|---|---|---|
| 4,901,964 A * | 2/1990 | McConnell | A61G 13/101 24/514 |
| 6,470,520 B1 * | 10/2002 | Weismiller | A61G 13/0009 5/602 |
| 6,598,275 B1 * | 7/2003 | Kolody | A61G 13/101 24/455 |
| 7,526,823 B2 * | 5/2009 | Koch | A61G 7/1019 5/600 |
| 9,730,851 B2 * | 8/2017 | Clark | A61G 13/101 |
| 2002/0170116 A1 * | 11/2002 | Borders | A61B 6/0457 5/600 |
| 2004/0223806 A1 * | 11/2004 | Seufert | A61B 6/04 403/317 |
| 2006/0117484 A1 * | 6/2006 | Derenne | A61G 13/0009 5/624 |
| 2007/0107129 A1 * | 5/2007 | Burstner | A61G 13/08 5/618 |
| 2007/0118989 A1 * | 5/2007 | Koch | A61G 7/1019 5/600 |
| 2009/0013507 A1 * | 1/2009 | Scott | A61G 13/101 24/502 |
| 2013/0247301 A1 * | 9/2013 | Daley | A61G 13/129 5/613 |
| 2016/0348836 A1 * | 12/2016 | Wyslucha | A61G 13/10 |

\* cited by examiner

CONNECTING DEVICE AND METHOD FOR UNLOCKING THE CONNECTING DEVICE

CROSS REFERENCES TO RELATED APPLICATION

This application claims the benefit of and priority to German Patent Application Serial No. 102016216996.3, filed on Sep. 7, 2016, which is incorporated herein by this reference in its entirety.

The invention relates to a connecting device, in particular a connecting device for two components of a patient support surface and to a method for unlocking said connecting device.

Patient support surfaces are known which have multiple components such as operation tabletop segments or extension devices. These components are coupled to one another via releasable connecting devices. It is possible to separate the individual components easily and without using tools, and therefore it is possible to interchange additional components easily.

These connecting devices are designed such that they automatically lock a connection when two components are coupled. The lock is then unlocked in order to release the connection. The unlocking merely brings locking elements out of engagement, however, so that it is additionally necessary to separate the connection by a movement of the coupled components, for example by pulling them apart or swiveling them. It is also necessary to actuate and keep a hold on an actuating element for the locking elements during the separation.

However, this makes separation complicated, and the separation of the components becomes particularly difficult in non-ergonomic working postures or if access to the connecting device is difficult.

The invention addresses the problem of solving the problems mentioned above and provides a connecting device that automatically locks and carries out a separation of the components while unlocking them.

This problem is solved by a connecting device as claimed in claim 1 and a method as claimed in claim 14. Further developments of the invention are the subject matter of the dependent claims.

In the connecting device according to the invention and the method according to the invention, a locking assembly is automatically pressed away from the coupling point of the connecting device by a locking element in the locking assembly in one movement during an unlocking process.

The invention will now be described in detail with reference to the appended drawings.

In particular,

Figure 1:
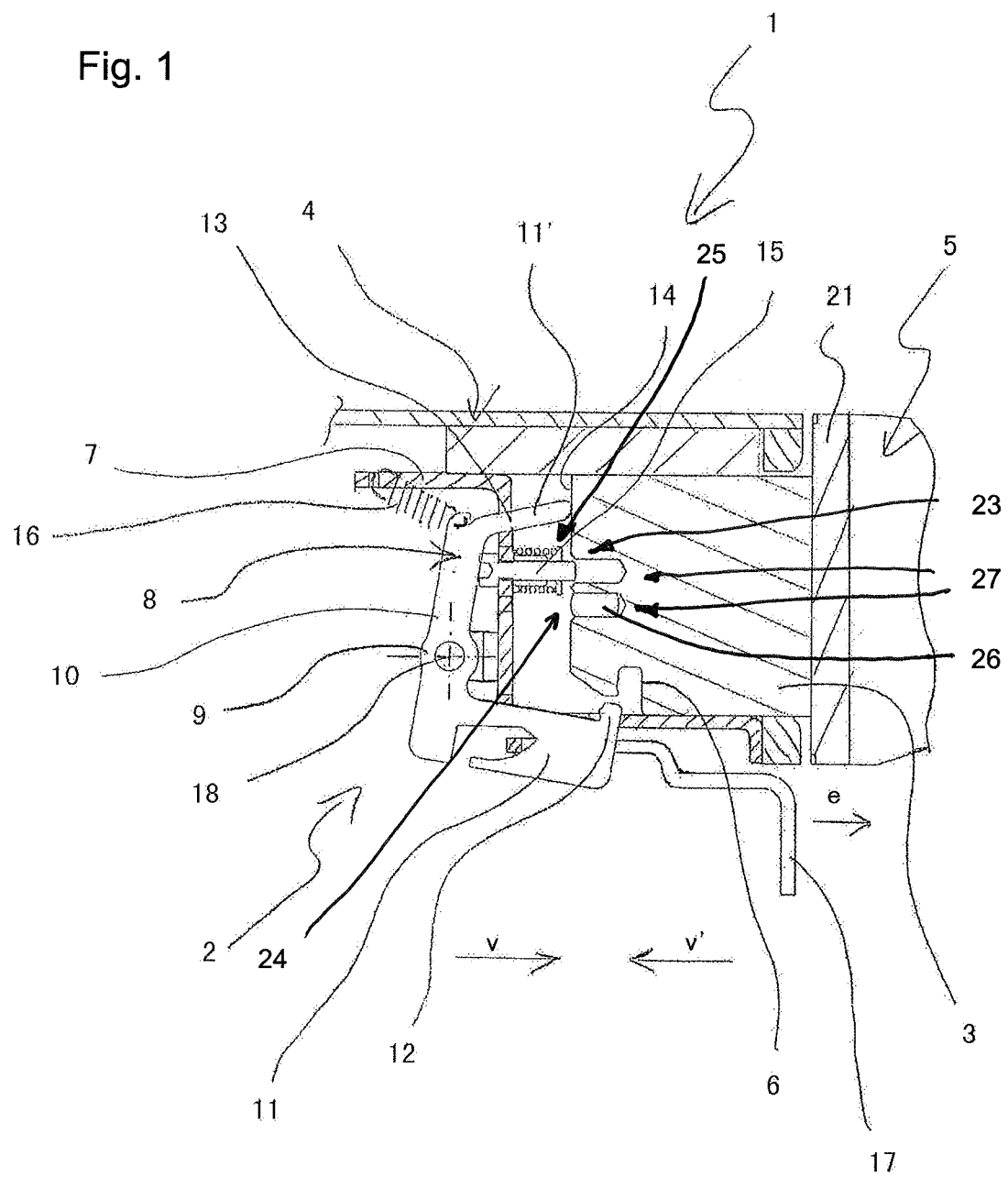
FIG. 1 shows a lateral sectional view of a connecting device as per the invention in an unlocked state.
Figure 2:
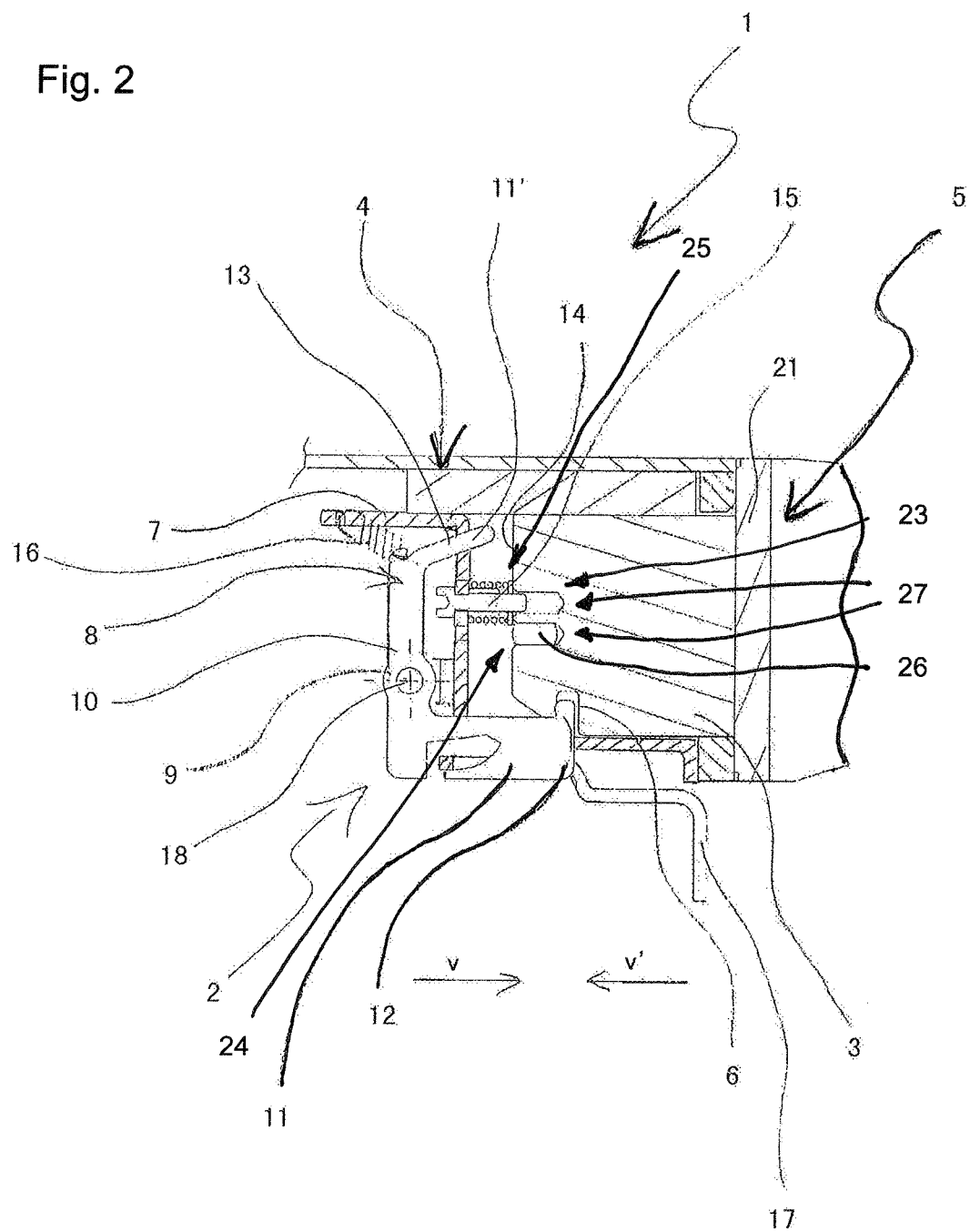
FIG. 2 shows a lateral sectional view of the connecting device in a locked state.

FIG. 1 shows a lateral sectional view of a connecting device 1 as per the invention in an unlocked state. FIG. 2 shows a lateral sectional view of the connecting device 1 in a locked state. The connecting device 1 has a locking assembly 2 and a coupling point 3.

The locking assembly 2 is arranged on a first component 4 of a patient support surface and the coupling point 3 is arranged on a second component 5 of the patient support surface. The locking assembly 2 and the coupling point 3 of the connecting device 1 are arranged such that the first component 4 and the second component 5 can be connected to one another in a respective connecting direction v, v' and locked to one another. The connecting direction v of the first component 4, i.e. also that of the locking assembly 2, and the connecting direction v' of the second component 5, i.e. also that of the coupling point 3, face one another and are parallel in this case.

The coupling point 3 extends from the second component 5 in the connecting direction v' thereof and has a locking receptacle 6. The locking receptacle 6 is formed in the shape of a recess in the coupling point 3. The recess can be a cutout having a limited width, such as a bore, a milled groove or a blind hole, or can extend over an entire width of the coupling point 3 perpendicular to the connecting direction v' of the coupling point 3 in a surface of the coupling point 3.

The locking assembly 2 has a support 7 that is fixed on the first component 4. A locking element 8 is pivotably mounted on the support 7 via a pivot bearing point 9 having a pivot axis 18. The support 7 is produced in this embodiment from a bent sheet metal part. This allows a cost-effective and flexible production. Alternatively, the support can also be made by different manufacturing methods such as casting or die-casting.

The locking element 8 has a U-shape with a first and a second leg 11, 11', which are substantially parallel here. Alternatively, a different cross-section such as an L-shape or an angled shape is possible.

The locking element 8 has a bearing portion 10. The pivot bearing point 9 is arranged in the bearing portion 10. The locking element 8 additionally has a locking portion 12 and a disengagement portion 13.

A locking position, as shown in FIG. 2, is a position of the first component 4 having the locking assembly 2 and the second component 5 having the coupling point 3, in which the first component 4 and the second component 5 are interlocked with one another.

An engagement position is a position of the locking element 8, that is to say a position and orientation, in which the locking portion 12 is received in the locking receptacle 6 in the locking position of the first and second components 4, 5.

The locking portion 12 is arranged such that it is substantially perpendicular to the connecting directions v, v' in the engagement position of the locking element 8. This guarantees secure locking, and unlocking is also possible without excessive exertion of force. The locking portion 12 can alternatively be arranged at an incline in relation to the connecting directions, but secure locking must be guaranteed and easy unlocking must be possible. In the case of the locking element 8 having the U-shape, the locking portion 12 is provided on one of the legs 11, 11', on the leg 11 in the present case.

The disengagement portion 13 is provided at an end of the locking element 8 that is located on a different side of the locking portion 12 in relation to the bearing portion 10. In the case of the locking element 8 having the U-shape, the disengagement portion 13 corresponds to one of the legs 11, 11', the leg 11' in the present case, which does not have the locking portion 12.

The connecting device 1 is configured such that, in a locking process as intended, the locking portion 12 can be brought into the locking recess 6 and thus the engagement position of the locking element 8. In an unlocking process, the locking portion 12 can be brought out of the locking recess 6 into an unlocking position disengaged from the locking recess 6, wherein the disengagement portion 13 can be moved in the connecting direction v of the locking assembly and presses against an end face 14 of the coupling point 3 in the connecting direction v' of the coupling point 3. In the case of the locking element 8 having the U-shape, a position of the locking portion 12 on the leg 11, a length of the disengagement portion 13, i.e. of the leg 11', a position of the locking receptacle 6 on the coupling point 3 and a predetermined distance of the end face 14 from the locking recess 6 in the locking direction v, v' are configured such that the disengagement portion 13 does not contact the end face 14, as shown in FIG. 1, until the locking portion 12 has exited from the locking recess 6, and in a continuation of this movement the disengagement portion 13 presses against the end face 14 and removes the locking assembly 2 from the coupling point 3.

A preload element 15 in the form of a spring-loaded pin is optionally provided in the locking assembly 2. The preload element 15 is arranged such that it presses against the coupling point 3 with a preload force in the connecting direction v when the first component 4 and the second component 5 are in the locked state.

This supports the removal of the locking assembly 2 from the coupling point 3 in the unlocking process, so that the locking assembly 2 can be separated more easily from the coupling point 3.

The locking assembly 2 is optionally also provided with an additional resilient element 16. The resilient element 16 is configured such that it presses the locking element 8 into the engagement position shown in FIG. 2. The resilient element 16 in the present case is arranged as a tension spring between the side of the disengagement portion 13 of the locking element 8 and the support 7. It can alternatively also be arranged as a tension spring between the side of the disengagement portion 13 and some other stationary part of the locking assembly 2, or as a compression spring between the side of the locking portion 12 of the locking element 8 and the support 7 or a different stationary part of the locking assembly 2, for example.

The locking assembly 2 is optionally provided with an unlocking lever 17 for the unlocking process. The unlocking lever 17 is engaged with the locking element 8 in such a manner that the locking element 8 can be moved out of the engagement position shown in FIG. 2 into the unlocking position by a movement of the unlocking lever 17. Alternatively, a direct actuation of the locking element or an actuation by a different unlocking mechanism is possible.

Figure 3:
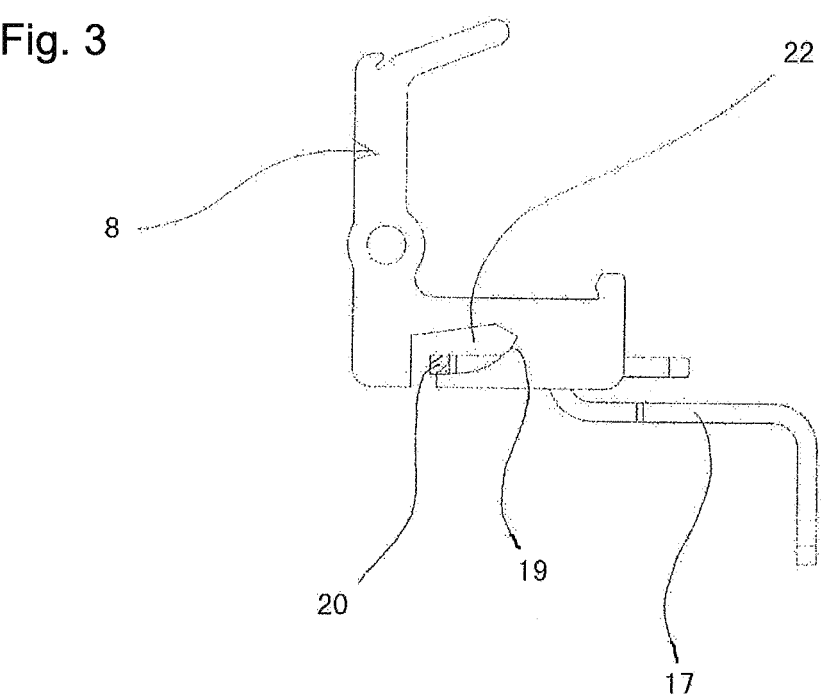
FIG. 3 shows a lateral sectional view of an unlocking mechanism.

For the purpose of unlocking, the unlocking lever 17 is mounted in the present embodiment such that an unlocking movement of the unlocking lever 17 can be carried out in a movement plane parallel to the pivot axis 18 of the locking element 8. The unlocking lever 17 can either be moved linearly or can be pivoted about a point of rotation. In the case of the linear movement, the locking element 8 has a face portion 19 as shown in FIG. 3, which is parallel to the pivot axis 18 and encloses an angle with the movement plane that can change along a pathway of the face portion 19. The unlocking lever 17 has an actuating portion 20 that is in contact with the face portion 19 of the locking element 8. In the engagement position of the locking element 8 as shown in FIGS. 2 and 3, the unlocking lever 17 is in a rest position. The locking element 8 and the unlocking lever 17 are configured such that, during an unlocking movement e of the unlocking lever 17 as shown in FIG. 1, the locking element 8 can be pivoted out of the engagement position shown in FIG. 2 by a movement of the actuating portion 20 along the face portion 19.

If the face portion 19 optionally encloses an angle that is not self-locking, particularly an angle α in a range from 7° to 12°, the unlocking lever 17 is moved into the rest position if, for example, the locking element 8 is urged by the force of the resilient element 16 into the engagement position.

If there is an optional cutout 22 in the locking element 8 on the side opposite from the face portion 19 relative to the actuating portion 20, instead of a connecting link precisely matching the actuating portion 20, the unlocking lever 17 is not moved if the locking element 8 is moved out of the engagement position by an action other than the unlocking movement e of the unlocking lever 17.

As shown in FIGS. 1 and 2, the second component 5 in the present embodiment has a compressively resilient plate element 21 on an end face that faces the first component 4. In an alternative embodiment, the compressively resilient plate element 21 is provided on an end face of the first component 4 facing the second opponent 5. The compressively resilient plate element 21 is optionally made from a closed-pore elastic foam material, such as sponge rubber or other compressively elastic materials, particularly elastic polymers.

In operation, the coupling point 3 is introduced into the locking assembly 2 in order to lock the first component 4 and the second component 5. In the process, the locking element 8 is pivoted out of the engagement position by a contact between the locking portion 12 and the coupling point 3. By providing the cutout 22, the unlocking lever 17 is not moved. As soon as the first component 4 and the second component 5 are in the locking position, the locking portion 12 penetrates into the locking receptacle 6, the locking element 8 moving into the engagement position thereof and locking the first component 4 and the second component 5.

The preload element 15 is optionally preloaded by the introduction of the coupling point 3 into the locking assembly 2.

For unlocking, the locking element 8 is pivoted out of engagement position thereof by the unlocking movement e of the unlocking lever 17. The locking portion 12 leaves the locking receptacle 6 and, as soon as the locking portion 12 has exited from the locking receptacle 6, the disengagement portion 13 contacts the end face 14 of the coupling point 3. During further pivoting of the locking element 8, the disengagement portion 13 presses against the end face 14 and moves the locking assembly 2 away from the coupling point 3 contrary to the connecting direction v of the locking assembly 2, without the necessity of additional force for the removal.

Removal of the locking assembly 2 from the coupling point 3 is assisted by the pressing element 15 if present.

The connecting device is optionally provided with a coding device. The coding device has a protruding coding element 23 on the locking assembly 2 and a corresponding opening 24 on the coupling point 3. Alternatively, the coding element 23 is provided on the coupling point 3 and the corresponding opening 24 on the locking assembly 7. The length of the coding element 23 is adjusted such that it penetrates in the locking position into the corresponding opening 24. Optionally, multiple positions for the protruding coding element 23 and multiple closable openings 24 at corresponding positions are provided. Therefore, the protruding coding element 23 can be mounted at different positions and the openings 24 that do not correspond to the position in which the coding element 23 is mounted are closed in order to prevent a protruding coding element 23 from entering, and thus only the locking assembly 2 and the coupling point 3 with appropriate coding can be connected.

The optional preload element 15 is designed in this case such that it can function as the coding element 23, as can be seen FIGS. 1 and 2. In this embodiment, the preload element 15 is provided with the protruding coding element 23, for example a screw, which is mounted on the support 7 protruding by a predetermined length therefrom. Around the protruding coding element 23, or alternatively adjacent thereto, a preloading element 25 is provided that carries out the function of the preload element 15. Multiple openings 24, which can be closed off by a plug 26, are provided in the coupling point 3. The preload element 15 can be mounted at different mounting positions, bores 27 in the present case, which correspond to the openings 24.

The coding device can alternatively also be provided independently of the preload element 15.

All the features presented in the description, the claims below and the drawings are essential to the invention both individually and in any combination with one another.

What is claimed is:

1. A connecting device for two components of a patient support surface wherein the connecting device has
    a locking assembly that is to be provided on a first component, and
    a coupling point that is to be provided on a second component, wherein
    the first and the second components can be connected to one another in a respective connecting direction (v, v') and locked to one another in a locking position,
    wherein the coupling point has a locking receptacle in the form of a recess,
    wherein the locking assembly has a support that is mounted on the first component, and a locking element that is pivotably supported on the support via a pivot bearing point,
    wherein the locking element has a locking portion, which is received in the locking receptacle (6) in the locking position of the first and the second components, a bearing portion on which the pivot bearing point is arranged, and a disengagement portion,
    wherein the locking assembly is configured such that the locking portion situated in the locking receptacle can be brought out of engagement with the locking receptacle in an unlocking process and the disengagement portion presses against an end face of the coupling point in the process, and
    wherein the locking assembly has a preload element that is configured such that, in the locking position, it presses against the coupling point with a preload force in the connecting direction (v).

2. The connecting device as claimed in claim 1, wherein the locking element has two legs, wherein
    the locking portion is provided on one of the legs, and the other leg forms the disengagement portion, and
    a position of the locking portion on the one leg, a length of the disengagement portion, a position of the locking receptacle on the coupling point and a predetermined distance of the end face of the coupling point from the locking receptacle in the locking direction (v, v') are configured such that the disengagement portion contacts the end face of the coupling point when the locking portion has exited from the locking receptacle during the unlocking movement, and in a continuation of this movement the disengagement portion presses against the end face of the coupling point and removes the locking assembly from the coupling point.

3. The connecting device as claimed in claim 1, wherein the locking assembly has a resilient element that is configured such that it urges the locking element into an engagement position, in which the locking portion is received in the locking receptacle.

4. The connecting device as claimed in claim 3, wherein the locking assembly has an unlocking lever that is displaceably supported in engagement with the locking element in such a manner that the locking element can be moved out of the engagement position by an unlocking movement of the unlocking lever.

5. The connecting device as claimed in claim 4, wherein the unlocking lever is mounted such that the unlocking movement of the unlocking lever can be carried out in a movement plane parallel to a pivot axis of the locking element, wherein
    the locking element has a face portion that is parallel to the pivot axis of the locking element and encloses an angle with the movement plane,
    the unlocking lever has an actuating portion that is in contact with the face portion of the locking element,
    in the engagement position of the locking element, the unlocking lever is in a rest position, and
    the locking element and the unlocking lever are configured such that the locking element can be pivoted out of the engagement position by a movement of the actuating portion of the unlocking lever along the face portion of the locking element during a movement of the unlocking lever.

6. The connecting device as claimed in claim 5, wherein the face portion of the locking element encloses an angle with the movement plane that is not self-locking, so that the unlocking lever is moved into the rest position when the locking element is urged by the force of the resilient element into the engagement position.

7. The connecting device as claimed in claim 6, wherein the angle (α) is in a range of 7° to 12°.

8. The connecting device as claimed in claim 4, wherein the locking element has a cutout on the side of the face portion opposite from an actuating portion, wherein the locking element is configured such that the unlocking lever is not moved if the locking element is moved out of the engagement position by a movement of an element other than the unlocking lever.

9. The connecting device as claimed in claim 1, wherein the first and/or second component has a compressively resilient plate element on an end face facing the respective other component.

10. The connecting device as claimed in claim 9, wherein the compressively resilient plate element is formed from sponge rubber.

11. The connecting device as claimed in claim 1, wherein the support is formed from a bent sheet metal part.

12. The connecting device as claimed in claim 1, wherein the connecting device has a coding device.

13. A patient support plate having a connecting device as claimed in claim 1.

14. A method for unlocking a connecting device according to claim 1, comprising the steps:
    pivoting the locking element of the locking assembly out of an engagement position in which the locking portion is received in the locking receptacle of the coupling point, wherein the locking portion exits from the locking receptacle and the disengagement portion contacts the end face of the coupling point;
    continuing the pivoting of the locking element, wherein the disengagement portion presses against the end face and removes the locking assembly from the coupling point.

15. A connecting device for two components of a patient support surface wherein the connecting device has
- a locking assembly that is to be provided on a first component, and
- a coupling point that is to be provided on a second component, wherein
- the first and the second components can be connected to one another in a respective connecting direction (v, v') and locked to one another in a locking position,
- wherein the coupling point has a locking receptacle in the form of a recess,
- wherein the locking assembly has a support that is mounted on the first component, and a locking element that is pivotably supported on the support via a pivot bearing point,
- wherein the locking element has a locking portion, which is received in the locking receptacle (6) in the locking position of the first and the second components, a bearing portion on which the pivot bearing point is arranged, and a disengagement portion,
- wherein the locking assembly is configured such that the locking portion situated in the locking receptacle can be brought out of engagement with the locking receptacle in an unlocking process and the disengagement portion presses against an end face of the coupling point in the process,
- wherein the locking assembly has a resilient element that is configured such that it urges the locking element into an engagement position, in which the locking portion is received in the locking receptacle, and
- wherein the locking assembly has an unlocking lever that is displaceably supported in engagement with the locking element in such a manner that the locking element can be moved out of the engagement position by an unlocking movement of the unlocking lever.

16. The connecting device as claimed in claim 15, wherein the unlocking lever is mounted such that the unlocking movement of the unlocking lever can be carried out in a movement plane parallel to a pivot axis of the locking element, wherein
- the locking element has a face portion that is parallel to the pivot axis of the locking element and encloses an angle with the movement plane,
- the unlocking lever has an actuating portion that is in contact with the face portion of the locking element,
- in the engagement position of the locking element, the unlocking lever is in a rest position, and
- the locking element and the unlocking lever are configured such that the locking element can be pivoted out of the engagement position by a movement of the actuating portion of the unlocking lever along the face portion of the locking element during a movement of the unlocking lever.

17. The connecting device as claimed in claim 16, wherein the face portion of the locking element encloses an angle with the movement plane that is not self-locking, so that the unlocking lever is moved into the rest position when the locking element is urged by the force of the resilient element into the engagement position.

18. The connecting device as claimed in claim 17, wherein the angle ($\alpha$) is in a range of 7° to 12°.

19. The connecting device as claimed in claim 15, wherein the locking element has a cutout on the side of the face portion opposite from an actuating portion, wherein the locking element is configured such that the unlocking lever is not moved if the locking element is moved out of the engagement position by a movement of an element other than the unlocking lever.

* * * * *